US010496312B2

(12) United States Patent
Lee

(10) Patent No.: US 10,496,312 B2
(45) Date of Patent: Dec. 3, 2019

(54) METHOD OF OPERATING A STORAGE DEVICE TO COMPRESS OR DECOMPRESS DATA AND A DATA STORAGE SYSTEM INCLUDING THE STORAGE DEVICE

(71) Applicant: SAMSUNG ELECTRONICS CO., LTD., Suwon-si, Gyeonggi-Do (KR)

(72) Inventor: Ju-Pyung Lee, Incheon (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 142 days.

(21) Appl. No.: 15/497,258

(22) Filed: Apr. 26, 2017

(65) Prior Publication Data

US 2018/0088812 A1  Mar. 29, 2018

(30) Foreign Application Priority Data

Sep. 27, 2016 (KR) .................. 10-2016-0124153

(51) Int. Cl.
*G06F 3/06* (2006.01)
*G06F 12/02* (2006.01)

(52) U.S. Cl.
CPC .............. *G06F 3/064* (2013.01); *G06F 3/061* (2013.01); *G06F 3/0608* (2013.01); *G06F 3/0625* (2013.01); *G06F 3/0653* (2013.01); *G06F 3/0661* (2013.01); *G06F 3/0679* (2013.01); *G06F 12/0246* (2013.01); *G06F 3/0656* (2013.01); *G06F 2212/1041* (2013.01); *G06F 2212/7201* (2013.01); *Y02D 10/154* (2018.01)

(58) Field of Classification Search
CPC ....... G06F 2211/007; G06F 2211/1014; G06F 2212/401; G06F 12/00; G06F 12/23; G06F 12/0292; G06F 12/0238; G06F 12/0246; G06F 3/064; G06F 3/061; G06F 3/0625; G06F 3/0653; G06F 3/0661; G06F 3/0679; G06F 3/0656; G06F 3/0608

See application file for complete search history.

(56) References Cited

U.S. PATENT DOCUMENTS 8,151,082 B2  4/2012  Flynn et al.
8,370,544 B2  2/2013  Lu et al.
9,329,991 B2  5/2016  Cohen et al.
(Continued)

FOREIGN PATENT DOCUMENTS

KR  10-2011-0030071  3/2011

*Primary Examiner* — Tracy A Warren
(74) *Attorney, Agent, or Firm* — F. Chau & Associate, LLC

(57) ABSTRACT

A method of operating a storage device including at least one nonvolatile storage and a storage controller configured to control the nonvolatile storage. A first type of request, original data and a first request information associated with the original data are received, in the storage controller, from an external host device, a compression operation to compress the original data to generate compressed data is performed in the storage controller, in response to the first type of request, and a write operation to write the compressed data in a data storage area of the nonvolatile storage is performed in the storage controller. The data storage area of the nonvolatile storage may store the first request information associated with the original data. The external host may manage mapping information in the form of a mapping table associated with compression/decompression at the storage device.

19 Claims, 19 Drawing Sheets

(56) References Cited

U.S. PATENT DOCUMENTS

| | | | |
|---|---|---|---|
| 2009/0150605 A1* | 6/2009 | Flynn | G06F 3/0613 |
| | | | 711/112 |
| 2011/0082842 A1* | 4/2011 | Groseclose, Jr. | G06F 3/0608 |
| | | | 707/693 |
| 2011/0252183 A1 | 10/2011 | Cho et al. | |
| 2012/0173778 A1* | 7/2012 | Povaliaev | G06F 3/0659 |
| | | | 710/68 |
| 2012/0265933 A1* | 10/2012 | Gupta | G06F 3/0689 |
| | | | 711/114 |
| 2014/0189421 A1 | 7/2014 | Werner et al. | |
| 2014/0201175 A1 | 7/2014 | Ohno | |
| 2014/0208004 A1* | 7/2014 | Cohen | G06F 12/0246 |
| | | | 711/103 |
| 2015/0046636 A1 | 2/2015 | Seo et al. | |
| 2015/0149789 A1* | 5/2015 | Seo | G06F 3/0608 |
| | | | 713/193 |
| 2017/0147253 A1* | 5/2017 | Kawamura | G06F 3/0638 |
| 2017/0286220 A1* | 10/2017 | Gerhard | G06F 11/1076 |
| 2018/0088811 A1* | 3/2018 | Kanno | G06F 3/0604 |

\* cited by examiner

| CLE | COMMAND LATCH ENABLE |
|-----|----------------------|
| ALE | ADDRESS LATCH ENABLE |
| nCE | CHIP ENABLE |
| nRE | READ ENABLE |
| nWE | WRITE ENABLE |

| ADDR | PG_OFS | SEC_OFS | NUM_SEC |
|------|--------|---------|---------|
| 0 | 0 | 0 | 5 |
| 1 | 0 | 5 | 4 |
| 2 | 1 | 1 | 5 |
| 3 | 1 | 6 | 1 |
| 4 | 1 | 7 | 3 |
| 5 | 2 | 2 | 8 |
| 6 | 3 | 2 | 2 |
| 7 | 3 | 4 | 4 |

FIG. 9B

| PG_OFS | STRIPE OF NVM1 | | | | | | | |
|--------|---|---|---|---|---|---|---|---|
| 0 | 0 | 0 | 0 | 0 | 0 | 1 | 1 | 1 |
| 1 | 1 | 2 | 2 | 2 | 2 | 2 | 3 | 4 |
| 2 | 4 | 4 | 5 | 5 | 5 | 5 | 5 | 5 |
| 3 | 5 | 5 | 6 | 6 | 7 | 7 | 7 | 7 |

SECTOR

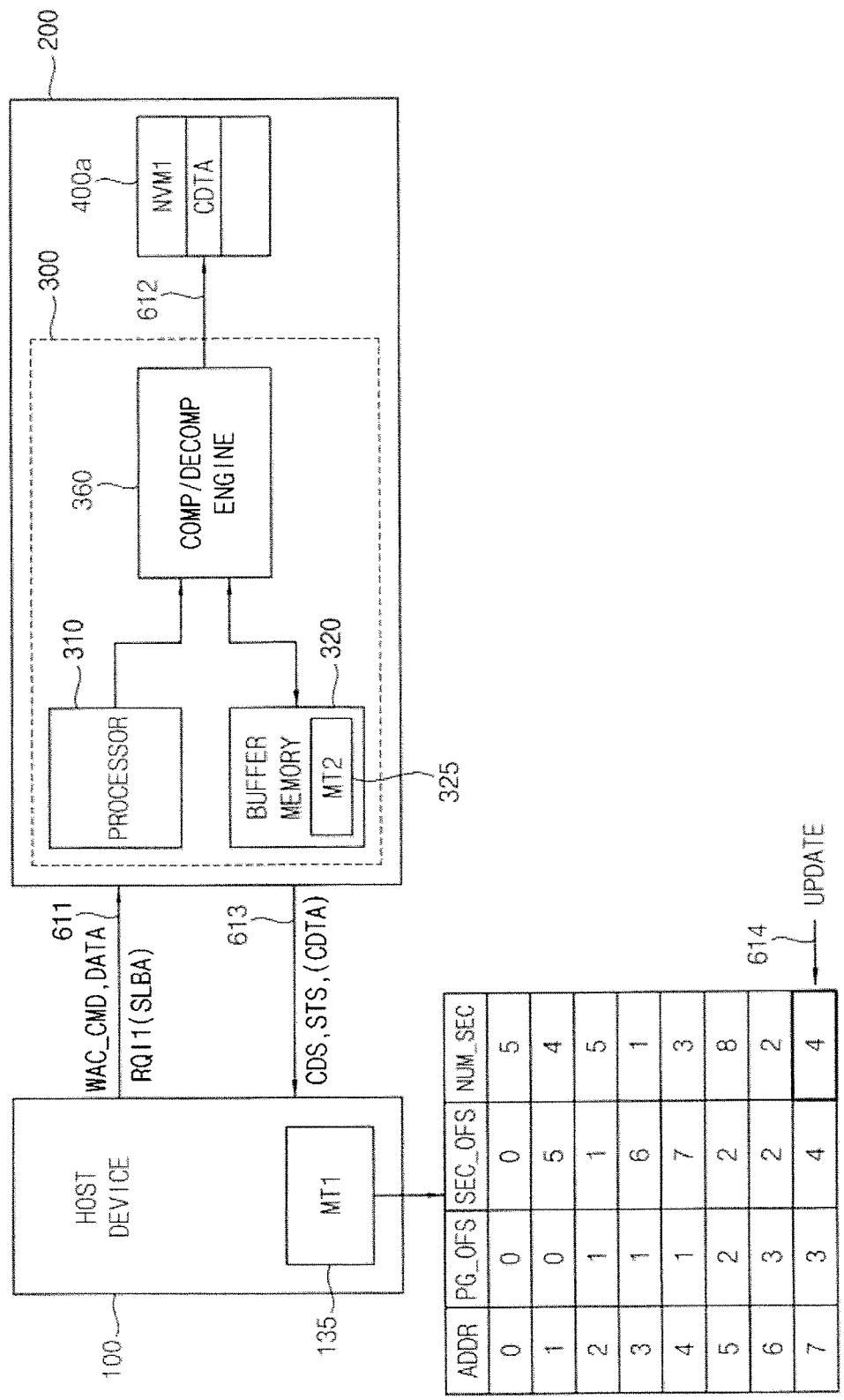

FIG. 11
STRIPE OF 400a
| 0 | 0 | 0 | 0 | 0 | 1 | 1 | 1 |
|---|---|---|---|---|---|---|---|
| 1 | 2 | 2 | 2 | 2 | 2 | 3 | 4 |
| 4 | 4 | 5 | 5 | 5 | 5 | 5 | 5 |
| 5 | 5 |   |   | 7 | 7 | 7 | 7 |
FIG. 12
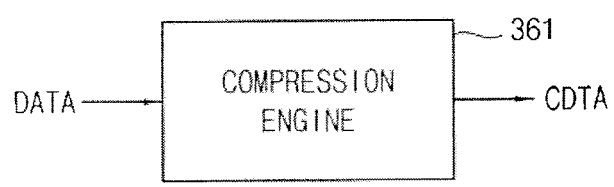
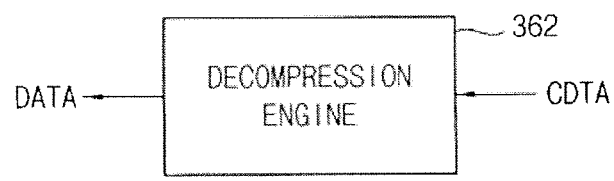

366

METHOD OF OPERATING A STORAGE DEVICE TO COMPRESS OR DECOMPRESS DATA AND A DATA STORAGE SYSTEM INCLUDING THE STORAGE DEVICE

CROSS-REFERENCE TO RELATED APPLICATION

This U.S. Non-provisional application claims priority under 35 U.S.C. § 119 from Korean Patent Application No. 10-2016-0124153, filed on Sep. 27, 2016, in the Korean Intellectual Property Office (KIPO), the disclosure of which is incorporated by reference herein.

1. TECHNICAL FIELD

Exemplary embodiments relate generally to data processing, and more particularly to a method of operating a storage device and a data storage system including a storage device.

2. DISCUSSION OF THE RELATED ART

In a data storage system, an encryption process may be performed to protect stored data from unauthorized access, or a data compression process may be performed to decrease the size of stored data. Whereas encryption is the conversion of data (e.g. plain text) into another form referred to as cipher text that requires a key or password to perform decryption, data compression enables a device to store compressed data using fewer bits as compared with storing decompressed data.

The compression and encryption processes are commonly performed by a host within the data storage system. However, these processes tend to decrease overall system performance and increase power consumption due to the arithmetic operations associated with performance of the compression process or the encryption process.

SUMMARY

Some exemplary embodiments of the inventive concept are directed to a method of operating a storage device, capable of impacting performance and reducing power consumption.

Some exemplary embodiments of the inventive concept are directed to provide a data storage system, capable of impacting performance and reducing power consumption.

According to exemplary embodiments of the inventive concept, a method of operating a storage device, includes receiving from an external host device, a first type of request, original data and a first request information associated with the original data based on a mapping information managed by the external host device; performing, by a storage controller, compression operation on the original data to generate compressed data, in response to receiving the first type of request; and writing the compressed data in a data storage area of a nonvolatile storage controlled by the storage controller. The first request information associated with the original data may be stored in the data storage area of the nonvolatile storage.

According to exemplary embodiments of the inventive concept, a data storage system may includes a storage device and a host device. The storage device includes at least one nonvolatile storage, and the storage device performs a compression operation to compress original data to generate compressed data, in response to a first type of request and a starting logical block address and performs a write operation to write the compressed data in a data storage area of the nonvolatile storage. The data storage area of the nonvolatile storage may correspond to the starting logical block address. The host device may control the storage device, and the host device may apply (e.g. transmit) the first type of request, the original data and the starting logical block address to the storage device to be executed by the storage device.

In an embodiment of the inventive concept, a data storage device may include a storage controller including at least one nonvolatile storage; a buffer memory connected to the storage controller; and a host interface configured to communicate with a host device, wherein the storage controller is configured to perform compression and decompression operations, and respectively write at least one of compressed data or decompressed data in the at least one nonvolatile storage according to mapping information provided via the host interface.

Accordingly, the host device may manage a mapping table at a system level without performing compression and decompression operations and the storage device performs the compression and decompression operations. Therefore, the host device may use fewer resources and the system may operate with reduced power consumption and changed performance.

BRIEF DESCRIPTION OF THE DRAWINGS

Illustrative, non-limiting exemplary embodiments of the inventive concept will be more clearly understood from the following detailed description in conjunction with the accompanying drawings.

FIG. 9A illustrates a first mapping table in the host device of FIG. 2, and FIG. 9B illustrates a stripe in which the compressed data is stored, in the nonvolatile memory device according to exemplary embodiments of the inventive concept.

FIG. 10 illustrates that the storage device in FIG. 1 performs a write after compression operation in response to the first type of request according to exemplary embodiments of the inventive concept.

FIG. 11 illustrates a stripe in the nonvolatile memory device of FIG. 6.

FIG. 12 is a block diagram illustrating an example of the compression/decompression engine in the storage device of FIG. 10 according to exemplary embodiments of the inventive concept.

DETAILED DESCRIPTION

Various exemplary embodiments of the inventive concept will be described more fully hereinafter with reference to the accompanying drawings, in which some exemplary embodiments are shown.

Figure 1:
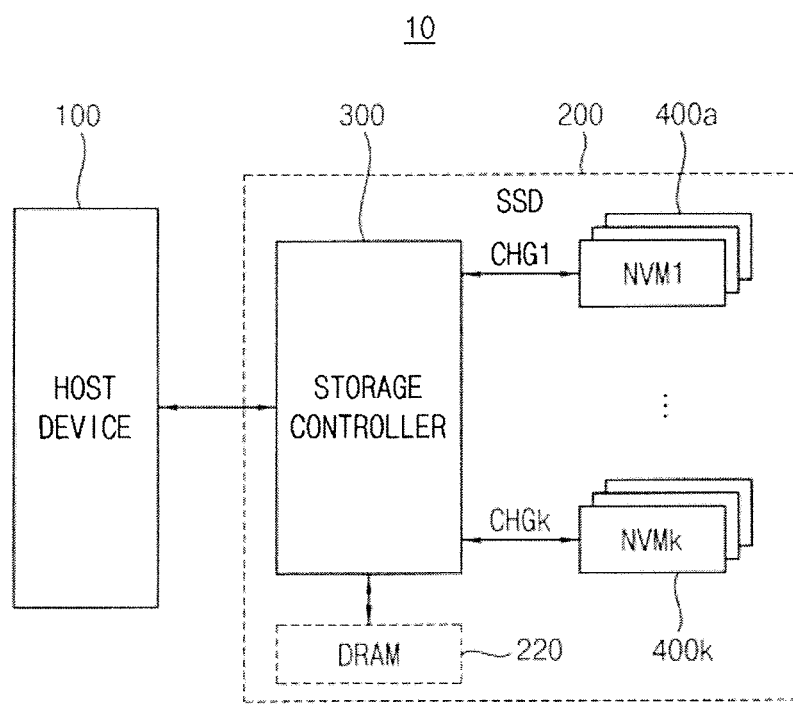
FIG. 1 is a block diagram illustrating a data storage system (or, a storage system) according to exemplary embodiments of the inventive concept.

FIG. 1 is a block diagram illustrating a data storage system (or, a storage system) according to exemplary embodiments of the inventive concept.

Referring to FIG. 1, a storage system 10 includes a host device 100 and a solid state drive (SSD, or, a storage device) 200 that may interface with the host device 100. An SSD is a nonvolatile storage device that stores persistent data on an array of semiconductor memory (e.g. flash memory) that may be organized as a disk drive.

The host device 100, for example, may control overall operation of the SSD 200. The host device 100 may exchange signals with SSD 200. The signals exchanged between the host device 100 and the SSD 200 may include, for example, a command signal, an address signal, data signals, etc.

The SSD 200 may include a storage controller 300 and a plurality of nonvolatile memory (NVM) devices 400a~400k. Each of the plurality of nonvolatile memory devices 400a~400k may be implemented with a NAND flash memory. In some exemplary embodiments, each of the nonvolatile memory devices 400a~400k may be, for example, nonvolatile memory device such as Phase Change Random Access Memory (PRAM), Resistance Random Access Memory (RRAM), Magneto-resistive Random Access Memory (MRAM), Ferroelectric random access memory (FRAM), etc.

The storage controller 300 of SSD 200 may exchange signals such as a command signal, an address signal, data signals, etc. with the host device 100. The storage controller 300 may write data in a corresponding nonvolatile memory device. In addition, the storage controller 300 may read data from a corresponding nonvolatile memory device in response to a command.

The SSD 200 may further include a dynamic random access memory (DRAM) 220 connected to the storage controller 300. The DRAM 220 may be used as a buffer area for temporarily storing data received from the host device 100 or temporarily storing data read from the nonvolatile memory devices 400a~400k. The DRAM 220 may also be used to drive software used for an effective management of the nonvolatile memory devices 400a~400k. The DRAM 220 may be used to store metadata received from the host device 100 and/or may be used to store cache data. In some other embodiments, the SSD 200 may be embodied in which the DRAM is replaced with volatile memories such as, for example, SRAM, etc. SRAM is typically faster and uses less power than DRAM, as SRAM does not have to be refreshed like DRAM, but SRAM is more expensive than DRAM.

The plurality of nonvolatile memory devices 400a~400k may provide a storage medium of the SSD 200. For example, the plurality of nonvolatile memory devices 400a~400k may be connected to the storage controller 300 through a plurality of channel groups CHG1~CHGk (shown in FIG. 1). Each of the channel groups CHG1~CHGk may include at least one channel. One or more nonvolatile memory devices may be connected to one channel group. A nonvolatile memory device connected to one channel group may be connected to the same data bus.

Although not shown, the SSD 200 may further include a pad to be connected to the host device 100. The SSD 200 can be easily attached to or detached from the host device 100 through the pad. The pad 210 may be formed inside the SSD 200, or may be formed in the form of a connector outside the SSD 200. In some embodiments, the SSD 200 may not include the pad and the SSD may be connected to the host device 100 through a routing process, that may utilize, for example, a routing table.

Figure 2:
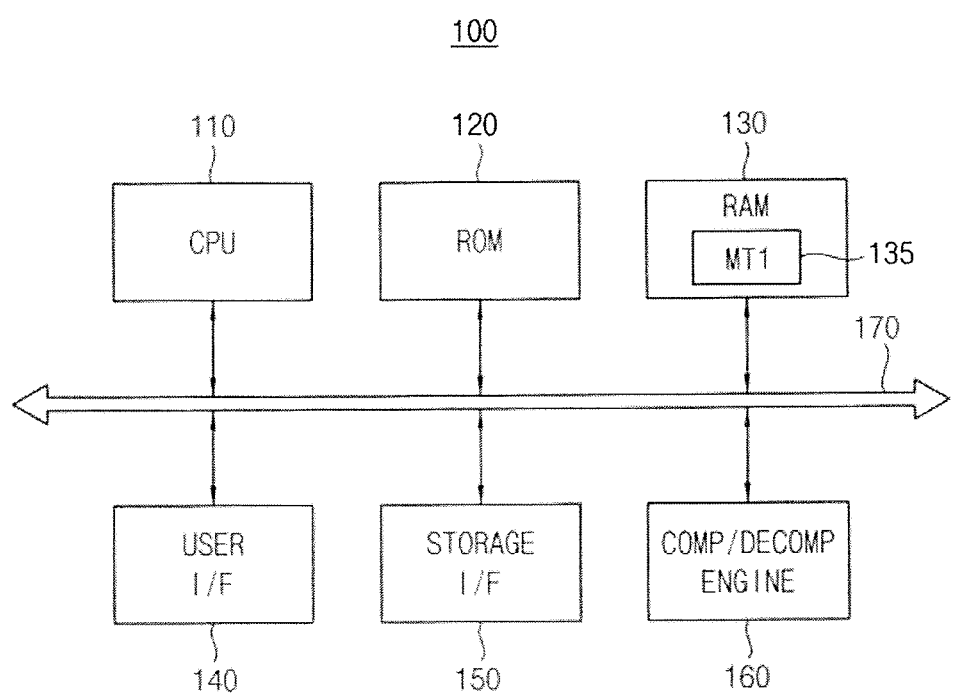
FIG. 2 is a block diagram illustrating the host device in FIG. 1 according to exemplary embodiments of the inventive concept.

FIG. 2 is a block diagram illustrating the host device in FIG. 1 according to exemplary embodiments of the inventive concept.

Referring to FIG. 2, the host device 100 may include a central processing unit (CPU) 110, a read-only memory (ROM) 120, a random access memory (RAM) 130, a user interface 140, a storage interface 150, a compression/decompression engine 160 and a bus 170.

The bus 170 may be embodied, for example, in the form of a transmission channel via which data and/or commands may be transmitted between the various components of the host device, for example, the CPU 110, the ROM 120, the RAM 130, the user interface 140, the storage interface 150 and the compression/decompression engine 160 of the host device 100.

The ROM 120 may store various application programs. For example, application programs supporting storage protocols such as Advanced Technology Attachment (ATA) (e.g. ATA may also be referred to as Integrated Device Electronics (IDE) used to support the connection of, for example, portable storage devices), Small Computer System Interface (SCSI) (a networking standard for linking storage components in, for example, a storage area network (SAN)

and may be embedded on a host adapter or system board), an embedded Multi Media Card (eMMC), and a Unix File System (UFS) protocols may be stored in the ROM 120.

The RAM 130 may temporarily store data or programs.

The user interface 140 may be embodied, for example, in a physical medium or a virtual medium for exchanging information between a user and the host device 100, a computer program, etc., and includes physical hardware and logical software. For example, the user interface 140 may include an input device for allowing the user to manipulate the host device 100, and an output device for outputting a result of processing an input of the user.

The CPU 110 may control overall operations of the host device 100. The CPU 110 may generate a request (or, a command) for storing data in the SSD 200 or a request (or a command) for reading data from the SSD 200 by using an application stored in the ROM 120, and transmit the request to the SSD 200 to execute a task via the storage interface 150.

With continued reference to the block diagram of the host device 100 shown in FIG. 2, the CPU 110 may generate, for example, a first type of request to direct a write after a compression operation, and a second type of request to direct a decompression read operation and may transmit to the SSD 200 the first type of request and/or the second type of request via the storage interface 150.

The RAM 130 may include a first mapping table (MT 1) 135 in which mapping information used by the host device 100 is stored when the storage device 200 executes the first type of request and/or the second type of request. The first mapping table 135 will be described herein below.

Figure 3:
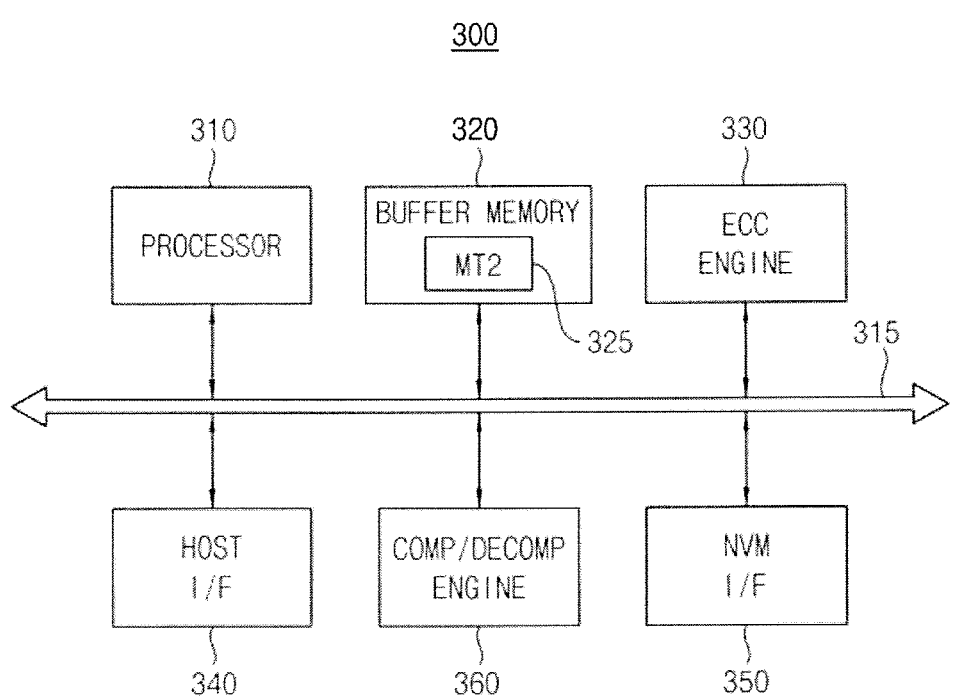
FIG. 3 is a block diagram illustrating the storage controller in FIG. 1 according to exemplary embodiments of the inventive concept.

FIG. 3 is a block diagram illustrating the storage controller 300 shown in FIG. 1 according to exemplary embodiments of the inventive concept.

Referring to FIG. 3, the storage controller 300 may include a processor 310 such as a CPU, a buffer memory 320 including a second mapping table (MT2) 325, an error correction code (ECC) engine 330, a host interface 340, a compression/decompression engine 360, a nonvolatile memory interface 350, and a bus 315.

The bus 315 may refer to a transmission channel via which data may be transmitted between the processor 310, the buffer memory 320, the ECC engine 330, the host interface 340, the compression/decompression engine 360, and the nonvolatile memory interface 350 of the storage controller 300. The processor 310 may perform an operation for data exchange between the host device 100 and the nonvolatile memory devices 400*a*~400*k*.

The host interface 340 is connected to the host device 100 and the nonvolatile memory interface 350 is connected to the nonvolatile memory devices 400*a*~400*k*. The processor 310 may communicate with the host device 100 via the host interface 340. The host interface 340 may be implemented using, but is not limited to, an Advanced Technology Attachment (ATA) interface, a Serial Advanced Technology Attachment (SATA) interface, a Parallel Advanced Technology Attachment (PATA) interface, a Universal Serial Bus (USB) or Serial Attached Small Computer System (SAS) interface, a Small Computer System Interface (SCSI), an embedded Multi Media Card (eMMC) interface, or a Unix File System (UFS) interface, just to name a few non-limiting examples. The processor 310 may communicate with the nonvolatile memory devices 400*a*~400*k* through nonvolatile memory interface 350. The nonvolatile memory interface 350 may be connected to each of the nonvolatile memory devices 400*a*~400*k*.

Although not illustrated in FIG. 3, the storage controller 300 may further include a DRAM interface connected to the DRAM 220 shown in FIG. 1.

The ECC engine 330 may generate an error correction code (ECC) for data which is received from the host device 100 using various engines during a write operation. For example, when data is stored, a code-specifying bit sequence may be estimated and stored as additional fixed bits.

During a read operation, the ECC block engine may perform error detection and error correction on data read from the nonvolatile memory devices 400*a*~400*k* to provide the data to the host device 100. The ECC engine 330 may perform ECC encoding and ECC decoding using various codes. For example, upon the data being requested a test for errors is performed, for example, a code may be calculated and compared with the stored additional fixed bits, and if the codes do not match, there is a correction of errors by changing bits that do not match.

The compression/decompression engine 360 shown in FIG. 3 may include at least one compression engine and at least one decompression engine. For example, the at least one compression engine, in response to the first type of request, may compress original data to generate a compressed data and may provide the compressed data to one of the nonvolatile memory devices 400*a*~400*k* via the NVM interface 350. The decompression engine, in response to the second type of request, may read the compressed data from one of the nonvolatile memory devices 400*a*~400*k*, and may decompress the read compressed data to recover the original data.

The buffer memory 320 may store temporarily, for example, one of the original data, the compressed data and the read compressed data. In addition, the buffer memory 320 may include a second mapping table (MT 2) 325 that stores mapping information to map a logical page number of a storage in which the compressed data is stored to a physical page number.

The storage controller 300 may be built-in to one of the nonvolatile memory devices 400*a*~400*k*, and the storage controller 300 and the nonvolatile memory devices 400*a*~400*k*, for example, may be fabricated as separate chips. The ECC engine 330 shown in FIG. 3, for example, may be included in the nonvolatile memory devices 400*a*~400*k* for reducing an amount of data transmission between the nonvolatile memory devices 400*a*~400*k* and the storage controller 300.

Figures 4, 5:
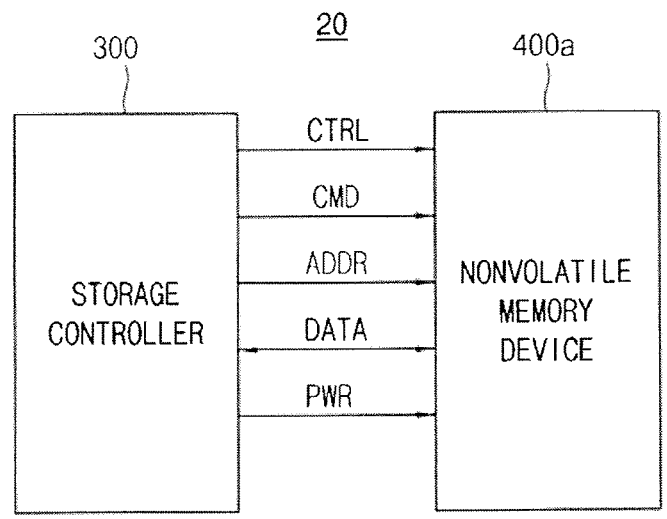
FIG. 4 is a block diagram illustrating a relationship between the storage controller and a nonvolatile storage (or, a nonvolatile memory device) in the storage device of FIG. 1.
FIG. 5 is a table illustrating control signals in the memory system of FIG. 4.

FIG. 4 is a block diagram illustrating a relationship between the storage controller 300 and a nonvolatile storage (or, a nonvolatile memory device) 400*a* in the storage device of FIG. 1.

Referring to FIG. 4, a memory system 20 may include a storage controller 300 and at least one nonvolatile memory device 400*a*.

The nonvolatile memory device 400*a* may perform, for example, an erase operation, a program operation, a write operation, a write after compression operation, or a decompression after read operation under control of the storage controller 300. The nonvolatile memory device 400*a* receives a command CMD, an address ADDR and data DATA through input/output lines from the storage controller 300 for performing such operations.

In addition, the nonvolatile memory device 400*a* receives a control signal CTRL through a control line and receives a power PWR signal through a power line from the storage controller 300.

FIG. 5 is a table illustrating control signals in the memory system of FIG. 4.

Referring to FIGS. 4 and 5, the control signal CTL, which the storage controller 300 applies (e.g., transmits, sends) to the nonvolatile memory device 400a, may include, for example, a command latch enable signal CLE, an address latch enable signal ALE, a chip enable signal nCE, a read enable signal nRE, and a write enable signal nWE.

The storage controller 300 may transmit the command latch enable signal CLE to the nonvolatile memory device 400a. More particularly, the storage controller 300 may transmit the command latch enable signal CLE to the nonvolatile memory device 400a via a separately assigned control pin. The command latch enable signal CLE may be a signal indicating that information transferred via the input/output lines constitutes a command.

With continued reference to FIG. 5, the storage controller 300 may transmit the address latch enable signal ALE to the nonvolatile memory device 400a. The storage controller 300 may transmit the ALE signal to the nonvolatile memory device 30 via a separately assigned control pin. The ALE signal may be a signal indicating that information transferred via the input/output lines is an address.

The storage controller 300 may transmit the chip enable signal nCE to the nonvolatile memory device 400a. The storage controller 300 may transmit nCE signal to the nonvolatile memory device 400a via a separately assigned control pin. The nCE signal may indicate that a particular memory chip is selected from among a plurality of memory chips when the nonvolatile memory device includes the plurality of memory chips.

The storage controller 300 may transmit the read enable signal nRE to the nonvolatile memory device 400a. The storage controller 300 may transmit the read enable signal nRE to the nonvolatile memory device 400a via a separately assigned control pin. The nonvolatile memory device 400a may transmit read data to the storage controller 300 in response to receipt of the read enable signal nRE.

The storage controller 300 may transmit the write enable signal nWE to the nonvolatile memory device 400a. The storage controller 300 may transmit the nWE signal to the nonvolatile memory device 400a via a separately assigned control pin. When the nWE signal is activated, the nonvolatile memory device 400a may store data input signals provided from the storage controller 300 as a command CMD or an address ADDR.

Figure 6:
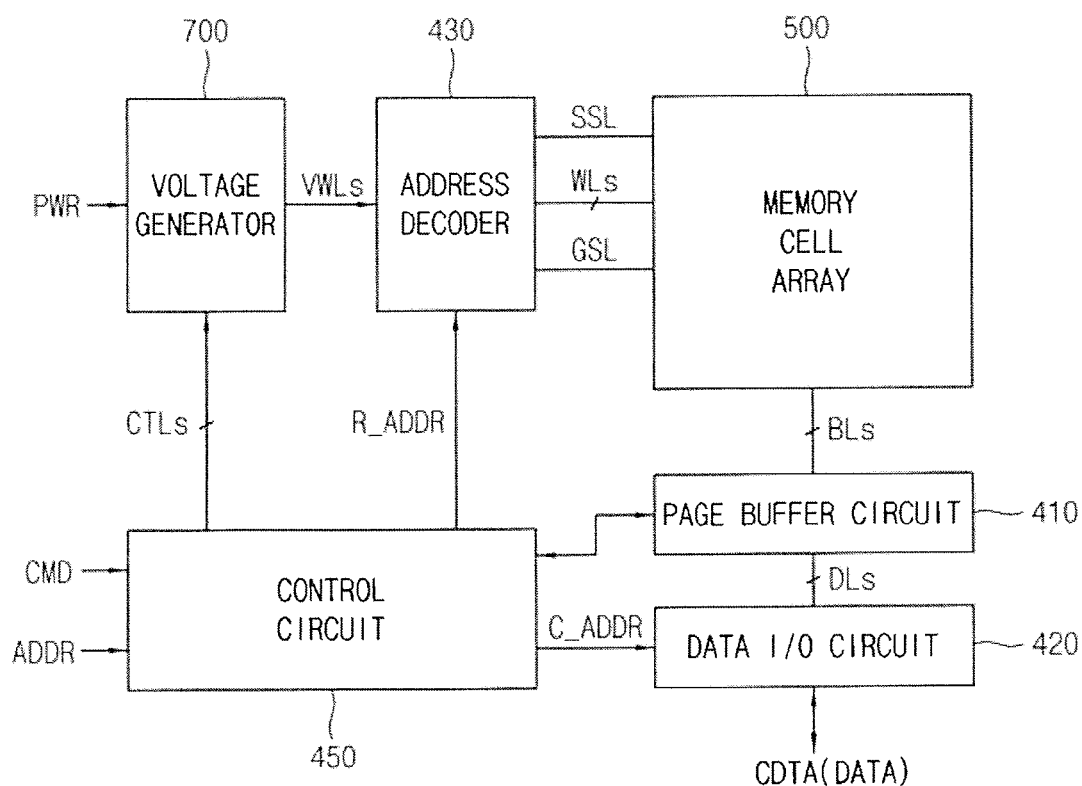
FIG. 6 is a block diagram illustrating the nonvolatile memory device in the memory system of FIG. 4 according to exemplary embodiments of the inventive concept.

FIG. 6 is a block diagram illustrating the nonvolatile memory device in the memory system of FIG. 4 according to exemplary embodiments of the inventive concept.

Referring to FIG. 6, the nonvolatile memory device 400a includes a memory cell array 500, an address decoder 430, a page buffer circuit 410, a data input/output circuit 420, a control circuit 450, and a voltage generator 700.

The memory cell array 500 may be coupled to the address decoder 430 through a string selection line SSL, a plurality of word-lines WLs, and a ground selection line GSL. In addition, the memory cell array 500 may be coupled to the page buffer circuit 410 through a plurality of bit-lines BLs.

The memory cell array 500 may include, for example, a plurality of memory cells coupled to the plurality of word-lines WLs and the plurality of bit-lines BLs.

In some exemplary embodiments, the memory cell array 500 may be a three-dimensional memory cell array, which is formed on a substrate in a three-dimensional structure (or a vertical structure). In this case, the memory cell array 500 may include vertical cell strings that are vertically oriented such that at least one memory cell is located over another memory cell. A person of ordinary skill in the art should understand and appreciate that there are various configurations of three-dimensional memory cell arrays other than shown in, for example, in FIG. 7. Such configurations of three-dimensional memory cell arrays may be used as an alternative or in addition to the three-dimensional memory cell array 500 shown in FIG. 7. The following patent documents, which are hereby incorporated by reference, describe suitable configurations for three-dimensional memory cell arrays: U.S. Pat. Nos. 7,679,133; 8,553,466; 8,654,587; 8,559,235; and US Pat. Pub. No. 2011/0233648.

In other exemplary embodiments of the inventive concept, the memory cell array 500 may be a two-dimensional memory cell array, which is formed on a substrate in a two-dimensional structure (or a horizontal structure).

Figure 7:
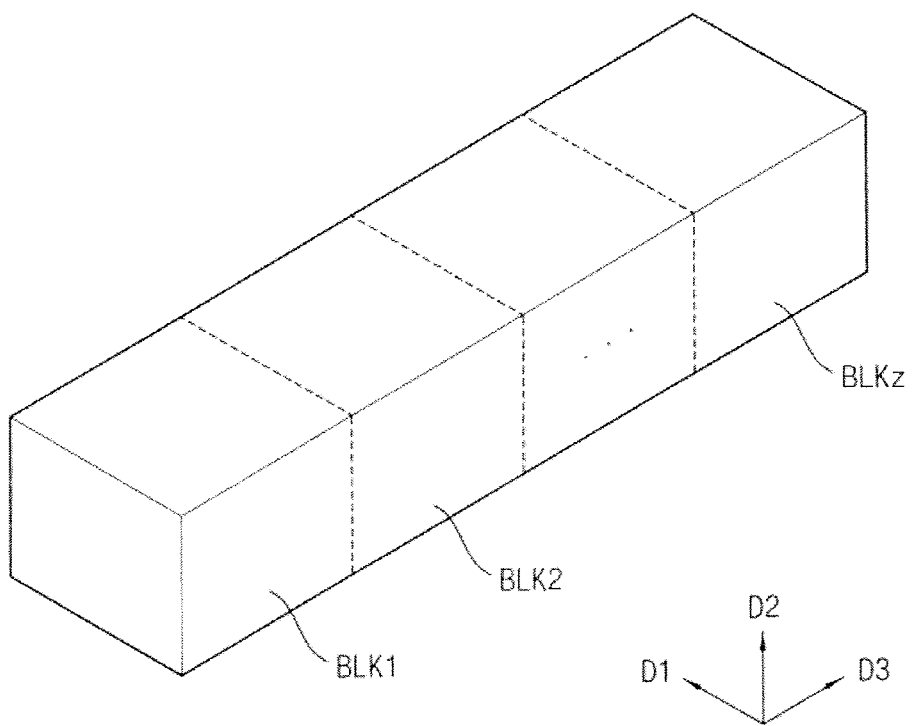
FIG. 7 is a block diagram illustrating the memory cell array in FIG. 6.

FIG. 7 is a block diagram illustrating the memory cell array 500 in FIG. 6.

Referring to FIG. 7, the memory cell array 500 may include a plurality of memory blocks BLK1 to BLKz. In an embodiment, the memory blocks BLK1 to BLKz are selected by the address decoder 430 in FIG. 6. For example, the address decoder 430 may select a memory block BLKx corresponding to a block address selected from among the memory blocks BLK1 to BLKz.

Figure 8:
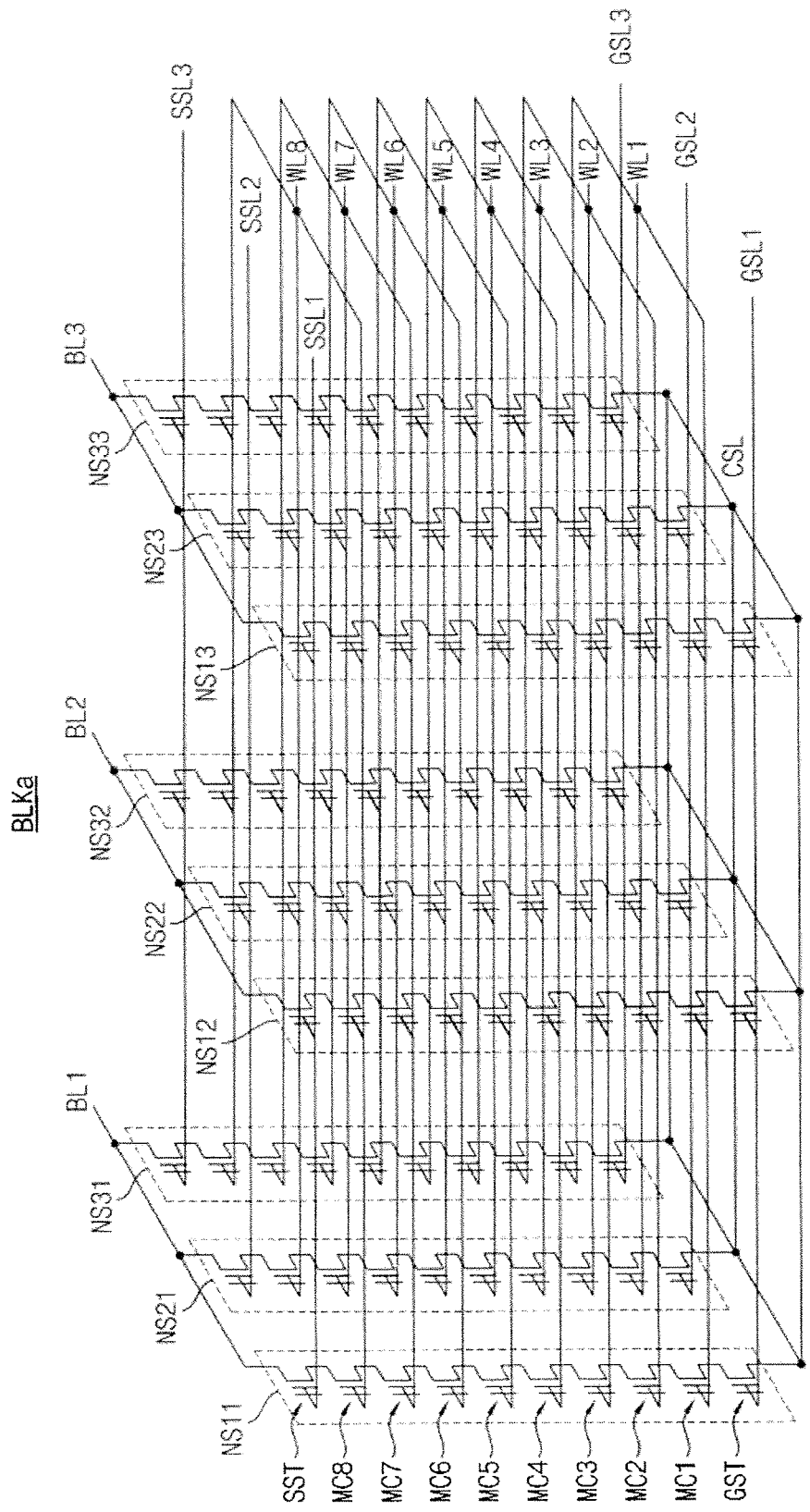
FIG. 8 is a circuit diagram illustrating one of the memory blocks of FIG. 7.

FIG. 8 is a circuit diagram illustrating one of the memory blocks of FIG. 7.

The memory block BLKa of FIG. 8 may be formed on a substrate in a three-dimensional structure (or a vertical structure). For example, a plurality of memory cell strings included in the memory block BLKb may be formed in a direction perpendicular to the substrate.

Referring to FIG. 8, the memory block BLKa may include memory cell strings NS11 to NS33 coupled between bit-lines BL1, BL2 and BL3 and a common source line CSL. Each of the memory cell strings NS11, NS21, NS31, NS12, NS22, NS32, NS13, NS23 NS33 may include a string selection transistor SST, a plurality of memory cells MC1, MC2, MC3, MC4, MC5, MC6, MC7 and MC8, and a ground selection transistor GST. In FIG. 10, each of the memory cell strings NS11 to NS33 is illustrated to include eight memory cells MC1 to MC8. However, exemplary embodiments are not limited thereto. In some exemplary embodiments, each of the memory cell strings NS11 to NS33 may include any number of memory cells. Word lines WL1, WL2, WL3, WL4, WL5, WL6, WL7, WL8 may be connected to respective memory cells.

The string selection transistor SST may be connected to corresponding string selection lines, for example SSL1, SSL2, SSL3. The plurality of memory cells MC1 to MC8 may be connected to corresponding word-lines WL1 to WL8, respectively. The ground selection transistor GST may be connected to corresponding ground selection lines, for example, GSL1, GSL2, GSL3. The string selection transistor SST may be connected to corresponding bit-lines BL1, BL2 and BL3, and the ground selection transistor GST may be connected to the common source line CSL.

Word-lines (e.g., WL1) having the same height may be commonly connected, and the ground selection lines GSL1, GSL2, GSL3 and the string selection lines SSL1, SSL2, SSL3 may be separated. In FIG. 9A, the memory block BLKb is illustrated to be coupled to eight word-lines WL1 to WL8 and three bit-lines BL1 to BL3. However, exemplary embodiments are not limited thereto. In some exemplary embodiments, the memory cell array 500 may be coupled to any number of word-lines and bit-lines.

Referring back to FIG. 6, the control circuit 450 may receive a command (signal) CMD and an address (signal) ADDR from the storage controller 300 that may control an erase loop, a program loop and a read operation of the nonvolatile memory device 400a based on the command signal CMD and the address signal ADDR. The program loop may include a program operation and a program verification operation. The erase loop may include, for example, an erase operation and an erase verification operation.

For example, the control circuit 450 shown in FIG. 6 may generate control signals CTLs, which are used for controlling the voltage generator 700, based on the command signal CMD, and generate a row address signal R_ADDR and a column address signal C_ADDR based on the address signal ADDR input to the control circuit 450. The control circuit 450 may provide the row address R_ADDR to the address decoder 430 and provide the column address C_ADDR to the data input/output circuit 420.

The address decoder 430 may be coupled to the memory cell array 500 through, for example, the string selection line SSL, the plurality of word-lines WLs, and the ground selection line GSL. During the program operation or the read operation, the address decoder 430 may determine one of the plurality of word-lines WLs as a first word-line (e.g., a selected word-line) and determine rest of the plurality of word-lines WLs except for the first word-line as unselected word-lines based on the row address R_ADDR.

With continued reference to FIG. 6, the voltage generator 700 may generate word-line voltages (VWLs), which are required for the operation of the nonvolatile memory device 400a, based on the control signals CTLs. The voltage generator 700 may receive a power PWR from the storage controller 300. The word-line voltages VWLs may be applied to the plurality of word-lines WLs through the address decoder 430.

For example, during an erase operation, the voltage generator 700 may apply an erase voltage to a well of the memory block and may apply a ground voltage to entire word-lines of the memory block. During the erase verification operation, the voltage generator 700 may apply an erase verification voltage to the entire word-lines of the memory block or sequentially apply the erase verification voltage to word-lines on a word-line basis.

For example, during a program operation, the voltage generator 700 may apply a program voltage to the first word-line and may apply a program pass voltage to the unselected word-lines that may activate memory cells associated with the unselected word lines, but not alter a program state of such memory cells. In addition, during the program verification operation, the voltage generator 700 may apply a program verification voltage to the first word-line and may apply a verification pass voltage to the unselected word-lines.

In addition, during a read operation, the voltage generator 700 may apply a read voltage to the first word-line and may apply a read pass voltage to the unselected word-lines.

The page buffer circuit 410 may be coupled to the memory cell array 500 through the plurality of bit-lines BLs. The page buffer circuit 410 may include a plurality of page buffers. In some exemplary embodiments, one page buffer may be connected to one bit-line. In other exemplary embodiments, one page buffer may be connected to two or more bit-lines.

The page buffer circuit 410 may temporarily store data to be programmed in a selected page, or may have data read out from the selected page.

The data input/output circuit 420 may be coupled to the page buffer circuit 410 through data lines DL. During the program operation, the data input/output circuit 410 may receive compressed data CDTA from the storage controller 300 and provide the compressed data CDTA to the page buffer circuit 410 based on the column address C_ADDR received from the control circuit 450. During the read operation, the data input/output circuit 420 may provide the compressed data CDTA, which are stored in the page buffer circuit 410, to the storage controller 300 based on the column address C_ADDR received from the control circuit 450.

In addition, the page buffer circuit 410 and the data input/output circuit 420 read data from a first area of the memory cell array 500 and write the read data to a second area of the memory cell array 500. For example, the page buffer circuit 410 and the data input/output circuit 420 may perform a copy-back operation.

FIG. 9A illustrates a first mapping table (MT 1) in the host device of FIG. 2. In addition, FIG. 9B illustrates a data stripe of the nonvolatile memory in which the compressed data is stored according to exemplary embodiments of the inventive concept.

With reference to FIGS. 9A and 9B, the storage device 200 stores the original data DATA in a stripe of the nonvolatile memory device 400a after compressing (e.g. performing a compression operation on) the original data DATA, in response to the first type of request from the host device 100.

In addition, in FIGS. 9A and 9B, it is assumed, for example, that data is stored in one of the memory blocks BLK1~BLKz after compressing data by using a page mapping and a sector granularity compression. In the page mapping, the data to be stored is mapped by a unit of page (for example, 4 KB) and in the sector granularity compression, the data to be stored is compressed in a multiple of sectors (for example, 512 bytes per sector).

When the original data having a size of 4 KB is to be stored and the original data having a size of 4 KB is compressed to have a size of 359 bytes, zero paddings are added to the compressed data and the compressed data may be stored in one sector of the stripe.

When the original data having a size of 4 KB is to be stored and the original data having a size of 4 KB is compressed to have a size of 3250 bytes, zero paddings are added to the compressed data and the compressed data may be stored in seven sectors of the stripe because a size of the compressed data is greater than six sectors and is smaller than a seven sectors.

FIG. 9A illustrates the first mapping table MT 1 135 when eight 4 KB data are stored using logical page addresses ADDR0~ADDR7. The first mapping table 135 that stores the logical page addresses ADDR0~ADDR7 and mapping information of a stripe, which is mapped to each of the logical page addresses ADDR0~ADDR7. The mapping information includes a page offset PG_OFS, a sector offset SEC_OFS and a sector number NUM_SEC. FIG. 9B illustrates that the eight 4 KB data are stored in one stripe of a memory block according to the mapping information.

In addition, the page offset PG_OFS denotes (e.g. indicates) a number of a physical page associated with each of the logical page addresses ADDR0~ADDR7, the sector offset SEC_OFS denotes (e.g. indicates) a number of a first sector in which the compressed data is initially stored in corresponding physical page, and the sector number NUM_SEC denotes (e.g. indicates) a total number of at least one sector in which the compressed data is stored. As is noted from FIG. 9B, each of the physical pages PG_OFS0~PG_OFS3 includes eight sectors, one 4 KB data associated with the logical page address ADDR7 is compressed into four sectors of corresponding data and is stored in four sectors of the physical page PG_OFS3, which starts from the fourth sector of the physical page PG_OFS3.

FIG. 10 illustrates that the storage device in FIG. 1 performs a write after a compression operation in response to the first type of request according to exemplary embodiments.

In a specification, the request may be replaced with a command.

In FIG. 10, it is assumed that 4 KB data is written in a seventh logical page address ADDR7 shown in FIG. 9A.

Referring to FIG. 10, the host device 100 applies a first type of request WAC_CMD to direct the write after compression operation, and the original data DATA is output to the storage device 200. The host device 100 may provide size information of the original data DATA to the storage device 200 and may selectively provide a starting logical block address SLBA of the nonvolatile memory device 400a, in which the compressed data is to be stored by referring to the first mapping table (MT 1) 135.

The host device 100 may selectively provide an identifier of a stripe in which the compressed data is to be stored and may receive location information in which the compressed data is stored from the storage device 200 instead of designating a location of the stripe in which the compressed data is to be stored.

As shown in FIG. 10, a remaining information except the first type of request WAC_CMD and the original data DATA may be referred to as a first request information RQI1.

Since the host device 100 manages the first mapping table 135 at a system level, the host device 100 may provide the storage device 200 with the page offset PG_OFS and the sector offset SEC_OFS as the first request information RQI1 along with the first type of request WAC_CMD as the reference numeral 611 indicates. The starting logical block address SLBA may be obtained by an expression corresponding to the page offset PG_OFS+total number of sectors of a physical page+the sector offset SEC_OFS. The starting logical block address SLBA may be, for example, block 28.

When the storage device 200 receives the first type of request WAC_CMD, the original data DATA and the starting logical block address SLBA, the host interface 340 (see FIG. 3) provides the first type of request WAC_CMD and the starting logical block address SLBA to the processor 310 and provides the original data DATA to the buffer memory 320.

With continued reference to FIG. 10, the processor 310 controls the buffer memory 320 to provide the original data DATA to the compression/decompression engine 360 according to the first type of request WAC_CMD. The compression/decompression engine 360 generates the compressed data CDTA by compressing the original data DATA under control of the processor 310 and stores the compressed data CDTA in a sectors of the nonvolatile memory device 400a, which starts from a twenty eighth sector as a reference numeral 614 indicates. The compression/decompression engine 360 may additionally or alternatively provide the compressed data CDTA to the buffer memory 320 under control of the processor 310.

When a size of the compressed data CDTA corresponds to four sectors and storing the compressed data CDTA in the stripe of the nonvolatile memory device 400a is complete, the storage device 200 may provide the host device 100 with a size information CDS of the compressed data CDTA and a status signal STS of the compression operation as a return information. The status signal STS may indicate whether storing of the compressed data CDTA is complete. The storage device 200 may selectively provide the compressed data CDTA to the host device 100 as the return information.

With continued reference to FIG. 10, the storage device 200 provides the compressed data CDTA to the host device 100 because when the storage device 200 is connected to the host device 100 along with another storage device via a redundant array of independent disks (RAID), parity is calculated based on the compressed data CDTA stored in the stripe and the parity is to be stored in another storage device.

When the host device receives the return information, the host device 100 may update the mapping information of the seventh logical address ADDR7 with the sector number SEC_NUM as the size information CDS of the compressed data as the reference numeral 614 indicates.

FIG. 11 illustrates a stripe in the nonvolatile memory device of FIG. 6.

Referring to FIG. 11, the 4 KB of original data DATA of the seventh logical address ADDR7 is compressed into the compressed data CDTA corresponding to four sectors of the and the compressed data CDTA is stored in four sectors in the stripe according to the write after the compression command WAC_CMD.

FIG. 12 is a block diagram illustrating an example of the compression/decompression engine in the storage device of FIG. 10 according to exemplary embodiments of the inventive concept.

Referring to FIG. 12, a compression/decompression engine 360a may include a compression engine 361 and a decompression engine 362.

In operation, the compression engine 361 may compress the original data DATA to generate the compressed data CDTA. Conversely, the decompression engine 362 may decompress the compressed data CDTA stored in the nonvolatile memory device to recover the original data DATA in response to the decompression after read command.

Figure 13:
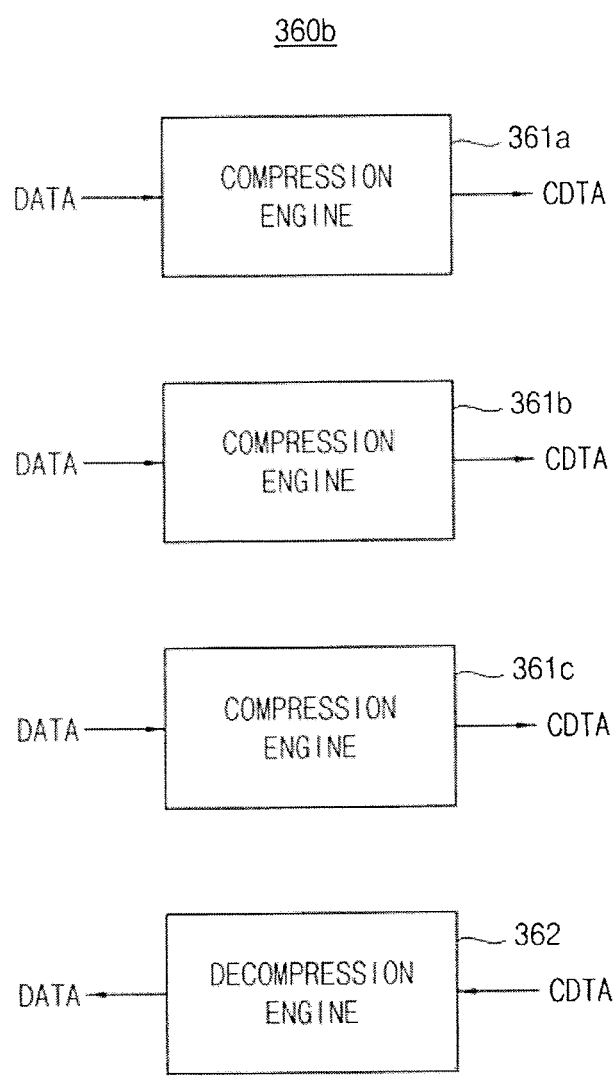
FIG. 13 is a block diagram illustrating another example of the compression/decompression engine in the storage device of FIG. 10 according to exemplary embodiments of the inventive concept.

FIG. 13 is a block diagram illustrating another example of the compression/decompression engine in the storage device of FIG. 10 according to exemplary embodiments of the inventive concept.

Referring to FIG. 13, a compression/decompression engine 360b may include a plurality of compression engines 361a, 361b and 361c and a decompression engine 362.

One of the of compression engines 361a, 361b and 361c may be selected based on a compression engine identifier included in address information and the selected compression engine may compress the original data DATA to generate the compressed data CDTA. The decompression engine 362 decompress the compressed data CDTA stored in the nonvolatile memory device to recover the original data DATA in response to the decompression after read command.

Figure 14:
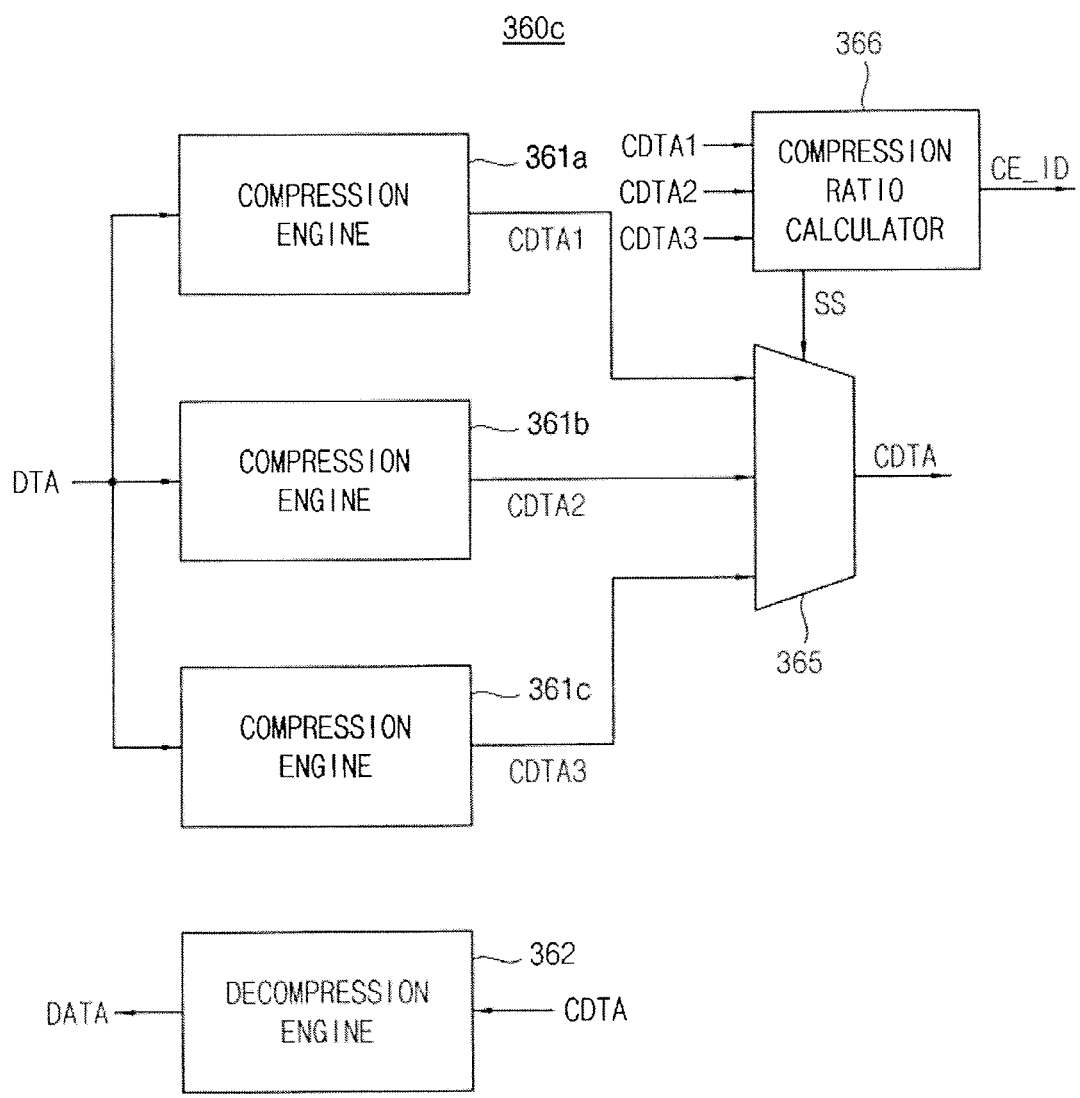
FIG. 14 is a block diagram illustrating another example of the compression/decompression engine in the storage device of FIG. 10 according to exemplary embodiments of the inventive concept.

FIG. 14 is a block diagram illustrating another example of the compression/decompression engine in the storage device of FIG. 10 according to exemplary embodiments.

Referring to FIG. 14, a compression/decompression engine 360c may include a plurality of compression engines 361a, 361b and 361c, a decompression engine 362, a compression ratio calculator 366 and a selection circuit 365.

In FIG. 14, the compression engines 361a, 361b and 361c may compress the original data DATA to generate first to third compressed data CDTA1, CDTA2 and CDTA3, respectively, and may provide the first to third compressed data CDTA1, CDTA2 and CDTA3 to the compression ratio calculator 366 and the selection circuit 365.

The compression ratio calculator 366 may calculate each compression ratio of the first to third compressed data CDTA1, CDTA2 and CDTA3, may generate a compression engine identifier CE_ID identifying a compression engine that outputs a highest compression ratio from among the first to third compressed data CDTA1, CDTA2 and CDTA3 and may generate a selection signal SS that is output to the selection circuit 365 to select a compressed data corresponding to the highest compression ratio. The compression ratio calculator 366 may provide the compression engine identifier CE_ID to the host device 100 as the return information and may provide the selection signal SS to the selection circuit 365.

The selection circuit 365, for example, may be implemented with a multiplexer and may select the compressed data corresponding to the highest compression ratio of the first to third compressed data CDTA1, CDTA2 and CDTA3 to output the compressed data CDTA in response to the selection signal SS.

The decompression engine 362 decompresses the compressed data CDTA stored in the nonvolatile memory device to recover the original data DATA in response to the decompression after read command.

Figure 15:
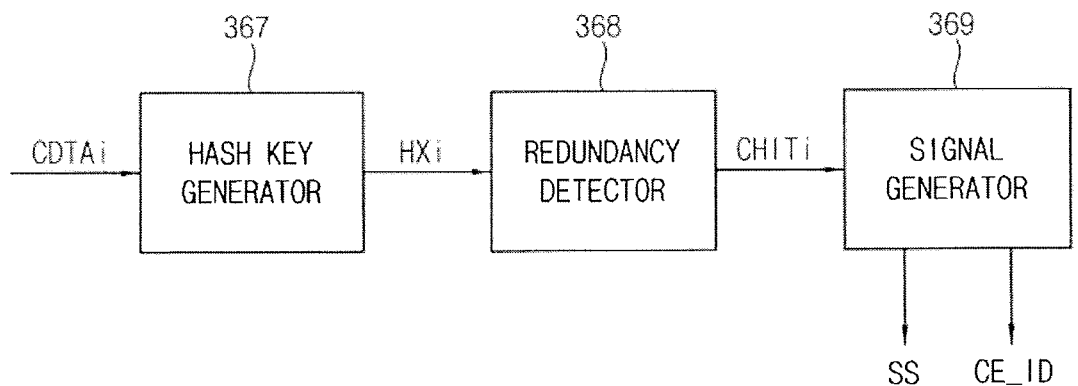
FIG. 15 is a block diagram illustrating the compression ratio calculator in FIG. 14 according to exemplary embodiments of the inventive concept.

FIG. 15 is a block diagram illustrating the compression ratio calculator in FIG. 14 according to exemplary embodiments of the inventive concept.

Referring to FIG. 15, the compression ratio calculator 366 may include a hash key generator 367, a redundancy detector 368 and a signal generator 369.

The hash key generator 367 may generate a hash key value HXi based on compressed data CDTAi. For example, hash key generator 367 may sequentially receive the compressed data CDTA1 by a predetermined unit (e.g., n-bytes, n>1, n is an integer) to generate a hash key value of data input by the predetermined unit. When a unit of currently input data has the same pattern as a unit of previously input data, a hash key value of the currently input data may be equal to the hash key value HXi of the previously input data. When a pattern of currently input data is different from that of previously input data, a hash key value of the currently input data may be different from that of a hash key value HXi of the previously input data.

The hash key generator 367 may include one or more hash key generators.

The redundancy detector 368 may detect a redundancy level based on a hash key value HXi generated by the hash key generator 367. In general, a high redundancy level means that a compression ratio is higher than a target compression ratio. The redundancy level may be determined according to a hit count of hash key values provided from the hash key generator 367. As shown in FIG. 15, the redundancy detector 368 may generates a hit count value CHITi indicating a redundancy level.

The signal generator 369 may generate the selection signal SS and the compression engine identifier CE_ID based on the hit count value CHITi. The signal generator 369 may provide the compression engine identifier CE_ID to the host device 100 as the return information and may provide the selection signal SS to the selection circuit 365 shown in FIG. 14.

Figure 16:
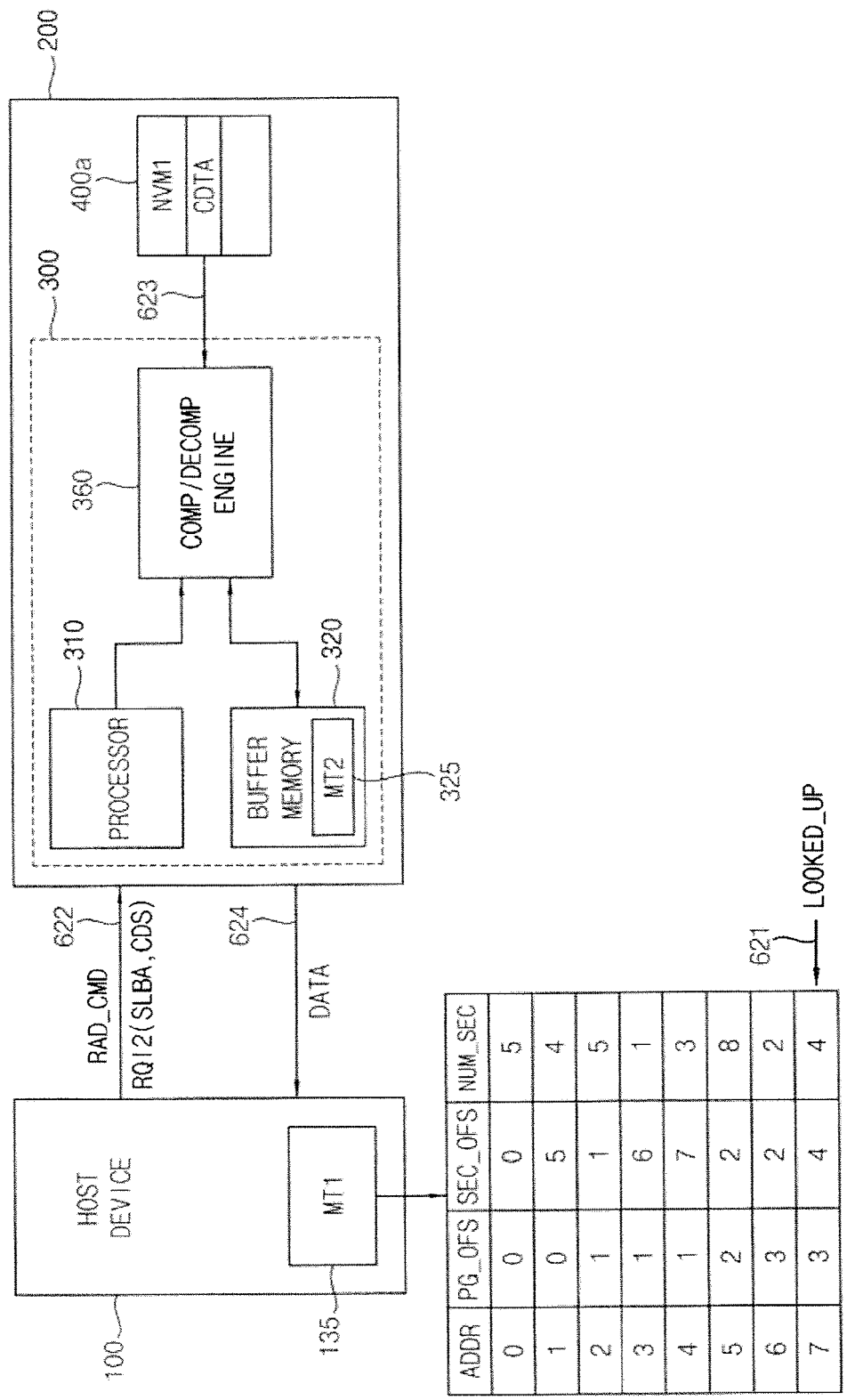
FIG. 16 illustrates that the storage device in FIG. 1 performs a decompression after read operation in response to the second type of request according to exemplary embodiments of the inventive concept.

FIG. 16 illustrates that the storage device in FIG. 1 performs a decompression after read operation in response to the second type of request according to exemplary embodiments of the inventive concept.

In FIG. 16, it is assumed that 4 KB data is read after 4 KB data is compressed to be written in a seventh logical page address ADDR7 in FIG. 9A.

Referring to FIG. 16, when the host device 100 is to perform a read operation, the host device 100 provides a location of the data to be read in the stripe by referring to the first mapping table 135 as a reference numeral 621 indicates and applies a second type of request RAD_CMD to direct the decompression after read operation and a second request information RQI2 to the storage device 200 as indicated by reference numeral 622. The second request information RQI2 includes the starting logical block address SLBA and the size information CDS of the compressed data.

The storage controller 300 in the storage device 200 receives from the host device the second type of request RAD_CMD, the starting logical block address SLBA and the size information CDS of the compressed data and reads the compressed data CDTA stored four sectors which starts from twenty eighth sectors in the stripe of the nonvolatile memory device 400a based on the starting logical block address SLBA and the size information CDS as a reference numeral indicates 623.

The decompression engine 362 in the compression/decompression engine 360 decompresses the read compressed data CDTA to recover the original data DATA and the storage controller 300 may transmit the original data DATA to the host device 100 as indicated by reference numeral 624. Thus, the host device 100 manages the information regarding the compression/decompression while the storage device 200 performs the compression/decompression operations.

With reference to FIG. 10, it is described that the data storage system 10 performs the write after compression operation on the original data DATA in response to the first type of request WAC_CMD. The host device 100 may provide a stripe identifier of a stripe in which the compressed data CDTA to be stored and may receive location information in which the compressed data is stored from the storage device 200 instead of providing the starting logical block address SLBA to the storage device 200 as address information.

In a case as described directly above, the storage device 200 may store the compressed data CDTA in a stripe identified by the stripe identifier or anther stripe based on whether the stripe identified by the stripe identifier has available sectors.

Figure 17:
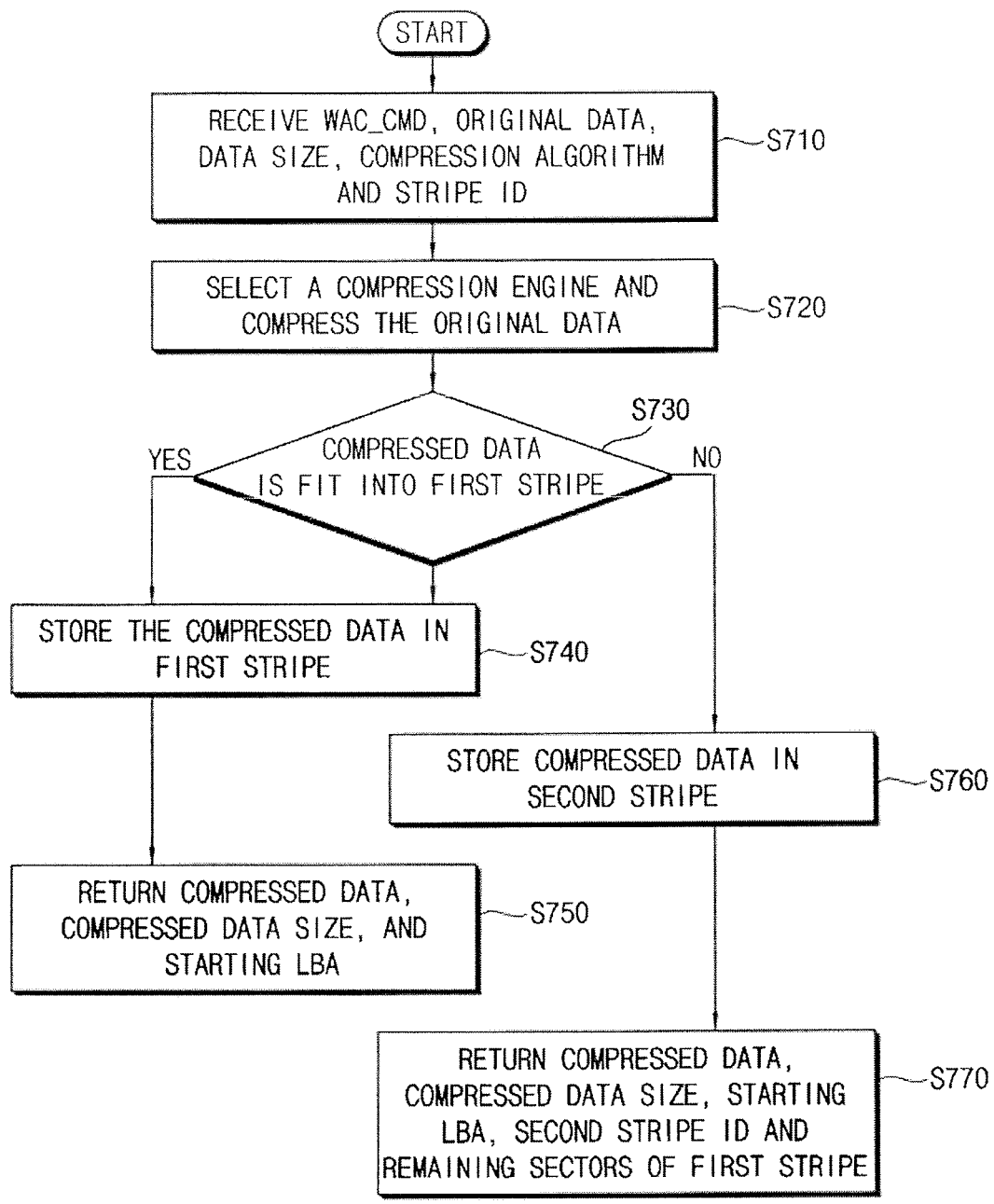
FIG. 17 illustrates a method of operating a data storage device according to exemplary embodiments of the inventive concept.

FIG. 17 illustrates a method of operating a data storage device according to exemplary embodiments of the inventive concept.

In FIG. 17, it is assumed that the compression/decompression engine 360 includes the compression engines 361a, 361b and 361c as shown in FIG. 13.

Referring to FIGS. 10 through 15 and 17, the storage device 200 receives the first type of request WAC_CMD, the original data DATA, the size information of the original data, a compression engine identifier and a stripe identifier from the host device (S710). The host device 100 may use, for example, a mapping table for managing mapping information and the storage device 200 performs compression and decompression operations.

The compression/decompression engine 360 in the storage controller 300 compresses the original data DATA to generate the compressed data CDTA using a selected one of the compression engines 361a, 361b and 361c, which is selected by the compression engine identifier (S720). The storage controller 300 determines whether all of the compressed data CDTA may be stored in available sectors which do not store data, in a first stripe identified by the stripe identifier (S730).

When the storage controller determines that all of the compressed data CDTA may fit into the available sectors in the first stripe (YES in S730), the storage controller 300 stores the compressed data CDTA in the available sectors in the first stripe (S740). When the storing the compressed data CDTA is completed, the storage controller 300 transmits, to the host device 100, the compressed data CDTA, the size information CDS of the compressed data CDTA and the starting logical block address SLBA indicating the available sectors as the return information (S750). The host device 100 may then update a mapping table with the information received from the storage controller.

However, when the storage controller 300 determines that all of the compressed data CDTA may not fit into the available sectors in the first stripe (NO in S730), the storage controller 300 stores the compressed data CDTA in sectors in a second stripe different from the first stripe (S760). When the storing of the compressed data CDTA is completed, the storage controller 300 transmits, to the host device 100, the compressed data CDTA, the size information CDS of the compressed data CDTA, a staring logical block address SLBA indicating the sectors storing the compressed data CDTA in the second stripe, a stripe identifier of the second stripe and information on the available sectors in the first sector as the return information (S770). The host device 100 may then update a mapping table with the information received from the storage controller 300.

Figure 18:
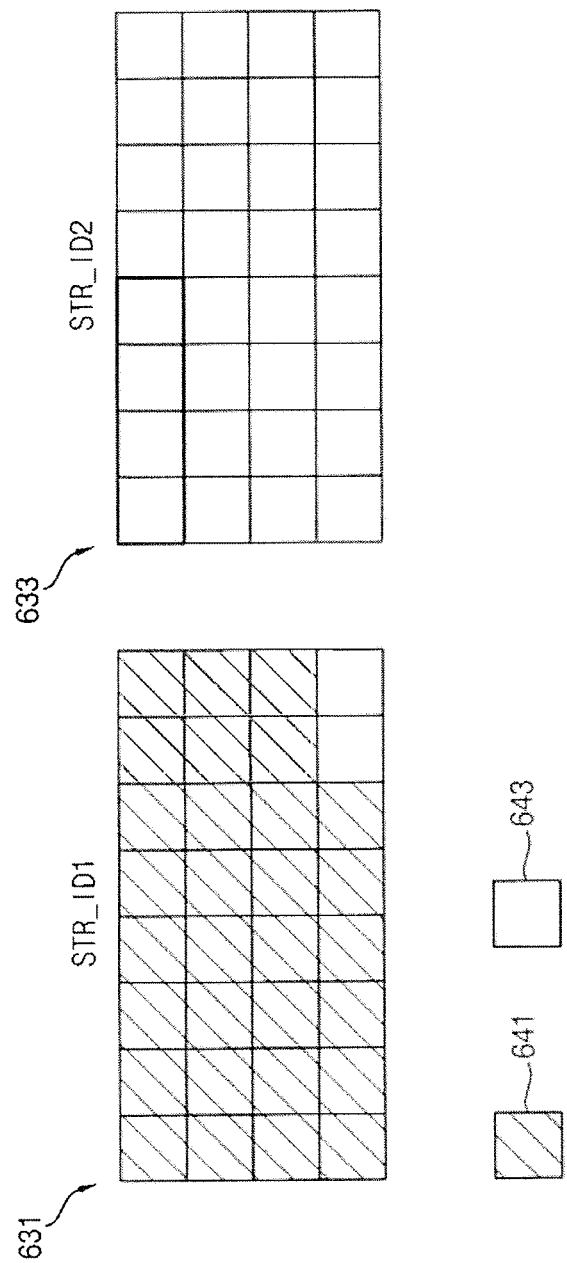
FIG. 18 illustrates first and second stripes in the nonvolatile memory device, based on the description in FIG. 17.

FIG. 18 illustrates first and second stripes in the nonvolatile memory device, which is described in FIG. 17.

In FIG. 18, a first stripe 631 has a first stripe identifier STR_ID1 and a second stripe 633 has a second stripe identifier STR_ID2. In addition, in FIG. 18, it is assumed that the first stripe 631 does not have available sectors sufficient to store the compressed data CDTA.

In FIG. 18, a reference numeral 641 indicates an unavailable sector that already stores data and a reference numeral 643 indicates an available sector that does not have stored data. Therefore, the compressed data CDTA having a size corresponding to four sectors, which is more than the two sectors available in the first stripe 631, is stored in available sectors in the second stripe 633.

Figure 19:
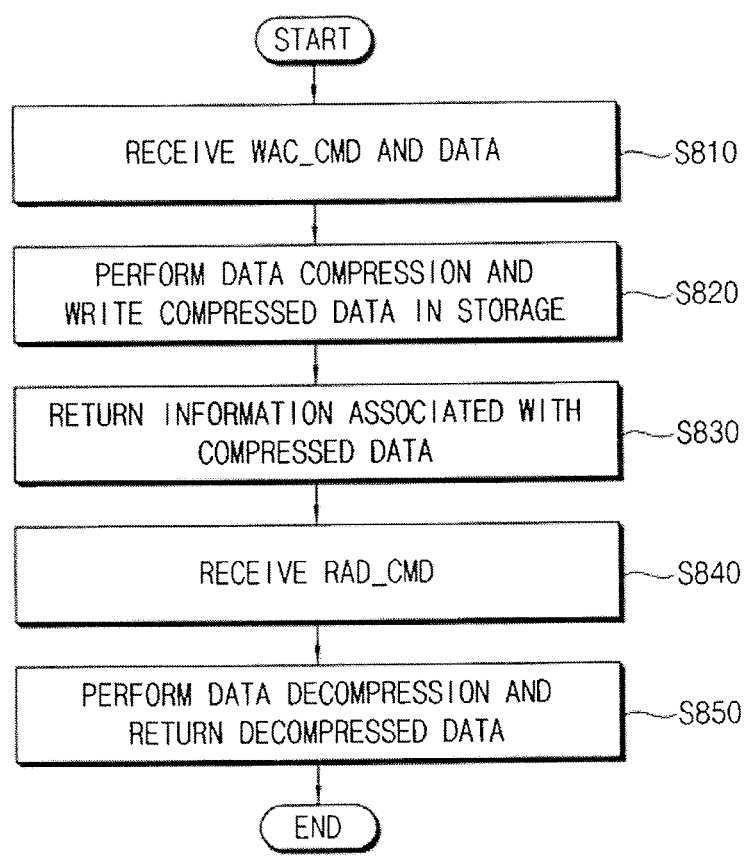
FIG. 19 is a flow chart illustrating a method of operating a storage device including at least one nonvolatile storage and a storage controller that controls the at least one nonvolatile storage according to exemplary embodiments of the inventive concept.

FIG. 19 is a flow chart illustrating a method of operating a storage device including at least one nonvolatile storage and a storage controller that controls the at least one nonvolatile storage according to exemplary embodiments of the inventive concept.

Referring to FIGS. 1 through 16 and 19, in a method of operating a storage device 200 including at least one nonvolatile storage 400a and a storage controller 300 that controls the at least one nonvolatile storage 400a, the storage controller 300 receives first type of request of a write after compression command (WAC_CMD), the original data DATA and a first request information associated with the original data from the host device 100 (S810). The first request information provided from the host device 100 may include at least some of the size information of the original data DATA, the starting logical block address SLBA, the stripe identifier, and the compression engine identifier as described above.

As described with reference to FIG. 10, the compression/decompression engine 360 performs a compression operation to compress the original data DATA to generate the compressed data CDTA, and the storage controller 300 writes (stores) the compressed data CDTA in the stripe (or, a data storage area) of the nonvolatile storage 400a (S820) identified by the stripe identifier.

When the write operation is completed, the storage controller 300 transmits, to the host device 100, information associated with the write operation of the compressed data CDTA as the return information (S830). The return information may include, for example, at least some of the size information CDS of the compressed data, the starting logical block address SLBA, the compressed data CDTA and a stripe identifier of another stripe storing the compressed data CDTA when a first stripe identified by the host does not have sufficient available sectors to store all of the information.

Once the write after compression operation is completed, the storage controller 300 receives the second type of request RAD_CMD and a second request information associated with the second type of request RAD_CMD from the host device (S840). The second request information may include the stripe identifier of the stripe storing the compressed data CDTA and the starting logical block address SLBA.

As described with reference to FIG. 16, the storage controller 300 reads the compressed data CDTA from the corresponding stripe, recovers the original data DATA by decompressing the compressed data CDTA and transmits the original data DATA to the host device 100, in response to the second type of request RAD_CMD (S850).

When the original data DATA is compressed into the compressed data CDTA and the compressed data CDTA is stored in the nonvolatile storage in response to the first type of request WAC_CMD, and when the compressed data CDTA is read, the read compressed data CDTA is decompressed into the original data DATA and the original data DATA is transmitted to the host device 100, in response to the second type of request (read after decompression) RAD_CMD, the host device 100 manages the mapping table 135 at the system level, so that the configuration of the mapping table (MT 2) 325 in the storage device may be simplified. In addition, the compression operation and the decompression operation is performed in the storage device 200, and thus a performance of the data storage system may be increased.

Since the host device 100 does not perform the compression operation and the decompression operation, the resources used in the host device 100 may be less than if the host performed compression and decompression operations, and thus the host device 100 may not need an extra hardware acceleration engine at the system level. In addition, since the host device 100 manages the mapping table 135 at system level, configuration of the mapping table 325 may be simplified. In addition, when two or more storage devices having different elastic capacity features are connected to the host device 100, the host device 100 may not need to be notified of the elastic capacity features.

Figure 20:
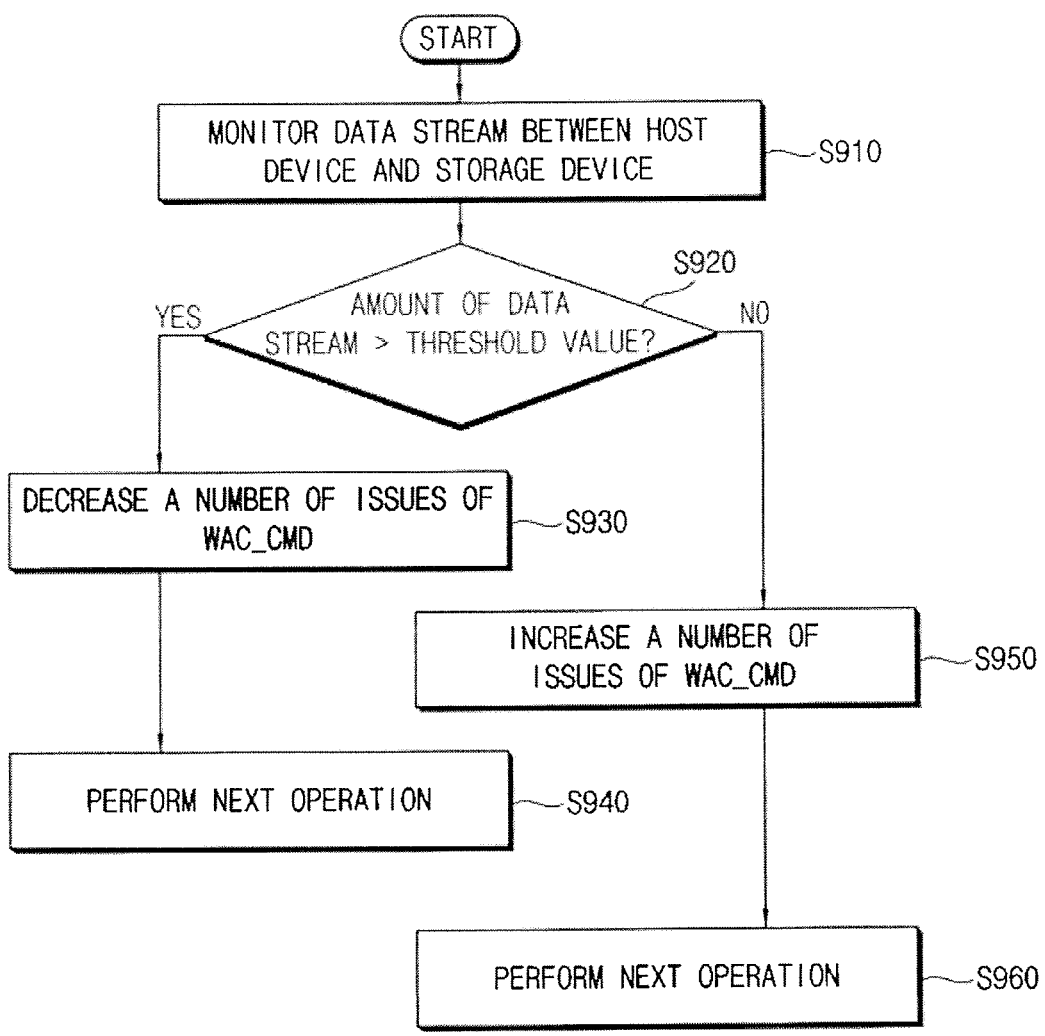
FIG. 20 is a flow chart illustrating a method of operation a data storage system according to exemplary embodiments of the inventive concept.

FIG. 20 is a flow chart illustrating a method of operation a data storage system according to exemplary embodiments of the inventive concept.

Referring to FIGS. 1 through 20, when the data storage system 10 employs the first type of request WAC_CMD and the second type of request RAD_CMD, the original data DATA is transmitted between the host device 100 and the storage device 200 and thus an amount of data streamed between the host device 100 and the storage device 200 increases to occupy more bandwidth of a bus connecting the host device 100 and the storage device 200.

To reduce performance degradation due to the increased use of bandwidth, in a method of operating a data storage system 10 including a host device 100 and at least one storage device 200, the CPU 110 may monitor the data stream between the host device 100 and the storage device 200 (S910). The CPU 110 determines whether the monitored amount of the data stream is greater than a threshold value (S920). The threshold value may be a value associated with causing a bottle neck phenomenon in a bus connecting the host device 100 and the storage device 200, and this threshold value may be determined experimentally.

When the monitored amount of the data stream is greater than the threshold value (YES in S920), the CPU 110 decreases a number of issues (e.g. decreases the dispensement, decreases a number of issuances) of the first type of request WAC_CMD per unit time interval (S930), and the CPU 110 may adjust operations by performing some of the compression operation and some of the decompression operation in the compression/decompression engine 160 at the host. The data storage system 10 performs a next operation due to the decreased number of issues (e.g. decreases the dispensement) of the first type of request WAC_CMD (S940).

When the monitored amount of the data stream is smaller than the threshold value (NO in S920), the CPU 110 increases a number of issues (e.g. increases the dispensement) of the first type of request WAC_CMD per unit time interval (S950), and the CPU 110 adjust operation by controlling the compression/decompression engine 360 in the storage device 300 to perform most of the compression operation and the decompression operation is performed in the compression/decompression engine 360. The data storage system 10 may performs a next operation due to the increased number of issues of the first type of request WAC_CMD (S960).

Figure 21:
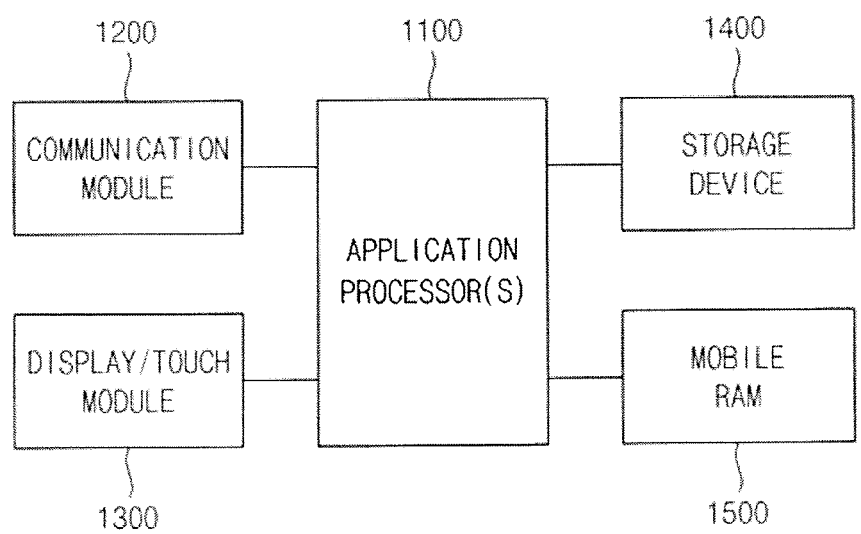
FIG. 21 is a block diagram illustrating a mobile device according to exemplary embodiments of the inventive concept.

FIG. 21 is a block diagram illustrating a mobile device according to exemplary embodiments.

Referring to FIG. 21, a mobile device 1000 may include an application processor 1100, a communication module 1200, a display/touch module 1300, a storage device 1400, and a mobile RAM 1500.

The application processor 1100 controls operations of the mobile device 1000. The communication module 1200 is implemented to perform wireless or wired communications with an external device. The display/touch module 1300 is implemented to display data processed by the application processor 1100 or to receive data through a touch panel. The storage device 1400 is implemented to store user data. The storage device 1400 may be, for example, eMMC, SSD, UFS device, etc.

The storage device 1400 may employ the storage device 200 of FIG. 1. The storage device 1400 may include a storage controller and at least one nonvolatile storage. The storage device 1400 may compress original data to store compressed data in the nonvolatile storage in response to a write after compression command from the application processor 1100, and may read the compressed data to decompress the compressed data in response to a decompression after read command from the application processor 1100. Therefore, performance of the mobile device 1000 may be increased.

The mobile RAM 1500 temporarily stores data used for processing operations of the mobile device 1000.

A storage device or a data storage system device according to exemplary embodiments may be packaged using various package types or package configurations.

The present disclosure may be applied to various electronic devices including a nonvolatile memory device. For example, the present disclosure may be applied to systems such as be a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc., just to name a few non-limiting examples.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present disclosure. Accordingly, all such modifications are intended to be included within the scope of the present disclosure as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of operating a storage device, comprising:
   receiving from an external host device, a first type of request, original data and first request information associated with the original data based on mapping information managed by the external host device, the first request information including a sector offset, a first stripe identifier that identifies a first stripe of a plurality of stripes of the nonvolatile storage device, and a sector number;
   performing, by a storage controller, a compression operation on the original data to generate compressed data, in response to receiving the first type of request;
   writing the compressed data in a data storage area of a nonvolatile storage device using the sector offset and the sector number, wherein the nonvolatile storage device is controlled by the storage controller;
   outputting, by the storage controller, a size of the compressed data to the host device; and
   updating, by the host device, the mapping information using the received size;
   wherein the first request information associated with the original data is stored in the data storage area of the nonvolatile storage, and
   wherein in response to the storage controller determining that available sectors of the first stripe are insufficient to store all of the compressed data, the storage controller stores the compressed data in a second stripe of the plurality different from the first stripe, and the storage controller transmits to the external host device, a second stripe identifier of the second stripe and information of the available sectors of the first stripe.

2. The method of claim 1, further comprising:
   transmitting, by the storage controller, a return information associated with the writing of the compressed data to the external host device after the writing of the compressed data in the nonvolatile storage is completed.

3. The method of claim 2, wherein the first request information includes a size of the original data, and wherein the return information includes a size information of the compressed data in the data storage area and a status signal indicating a status of the writing of the compressed data.

4. The method of claim 3, wherein the first request information further includes a starting logical block address of the first stripe of the nonvolatile storage in which the compressed data is to be stored based on the mapping information in the external host device, and wherein the return information further includes the compressed data.

5. The method of claim 3, wherein the first request information further includes a first stripe identifier that identifies an engine identifier that identifies a selected compression engine of a plurality of compression engines, wherein the selected compression engine performs the compression operation on the original data to generate the compressed data, and wherein the return information further includes a starting logical block address of the stripe of the nonvolatile storage in which the compressed data is stored.

6. The method of claim 1, wherein the storage controller includes at least one compression/decompression engine, and the compression operation on the original data to generate the compressed data is performed by at least one compression engine of the at least one compression/decompression engine.

7. The method of claim 1, wherein the storage controller includes a compression/decompression engine including a plurality of compression engines, and the compression operation on the original data to generate the compressed data is performed by a compression engine of the plurality of compression engines, and wherein the compression engine is selected according to a compression engine identifier that identifies one of the plurality of compression engines.

8. The method of claim 1, wherein the storage controller includes at least one compression/decompression engine including a plurality of compression engines, the compression operation on the original data to generate the compressed data is performed in each of a plurality of compression engines in the at least one compression/decompression engine, and the storage controller transmits the compressed data output from one compression engine of the plurality of compression engines to the nonvolatile storage, wherein the one compression engine is selected based on a compression ratio of each of the plurality of compression engines.

9. The method of claim 1, wherein after the writing of the compressed data is completed, the method further comprises: receiving, by the storage controller, a second type of request, and a second request information associated with the compressed data from the external host device; reading, by the storage controller, the compressed data from the data storage area in response to the second type of request; decompressing, by the storage controller, the compressed data to recover the original data; and transmitting, by the storage controller, the recovered original data to the external host device.

10. The method of claim 1, further comprising: monitoring, by the external host device, an amount of a data stream transmitted between the external host device and the storage device; determining, by the external host device, whether the monitored amount of the data stream is greater than a threshold value; and adjusting, by the external host device, a number of issuances of the first type of request adaptively based on the determining whether the monitored amount of the data stream is greater than a threshold value.

11. The method of claim 10, wherein the number of issuances of the first type of request is decreased in response to determining the monitored amount of the data stream is greater than the threshold value.

12. The method of claim 10, wherein the number of issuances of the first type of request is increased in response to determining the monitored amount of the data stream is less than the threshold value.

13. The method of claim 9, wherein the first type of request corresponds to a write after compression command (WACCMD) to direct that the original data is compressed into the compressed data and then the compressed data is written, and wherein the second type of request corresponds to a decompression after read command (DACCMD) to direct that the compressed data is read and then the read compressed data is decompressed.

14. The method of claim 1, wherein the mapping information maps a logical address of the data storage area to the sector offset and the sector number, and the updating changes the sector number based on the received size.

15. A data storage system comprising:
a host device including mapping information and generating first request information based on the mapping information;
a storage device external to the host device, the storage device including a processor and a nonvolatile storage device, wherein the storage device is configured to:
perform a compression operation on original data received from the host device to generate compressed data, in response to receipt of a first type of request from the host device, perform a write operation to write the compressed data in a data storage area of the nonvolatile storage, device using a sector offset, a first stripe identifier that identifies a first stripe of a plurality of stripes of the nonvolatile storage device, and a sector number included in the first request information received from the host device along with the request, and output a size of the compressed data to the host device; and
a host interface configured to interface the storage device to the host device, wherein the host device updates the mapping information using the received size, and
wherein in response to the storage controller determining that available sectors of the first stripe are insufficient to store all of the compressed data, the storage controller stores the compressed data in a second stripe of the plurality different from the first stripe, and the storage controller transmits to the host device, a second stripe identifier of the second stripe and information of the available sectors of the first stripe.

16. The data storage system of claim 15, wherein the host device is configured to control the storage device, and the host device is configured to send the first type of request, the original data and the first request information to the storage device via the host interface.

17. The data storage system of claim 16, wherein the host device includes a mapping table configured to map a logical address of the data storage area to a page offset, the sector offset and the sector number, and wherein the page offset indicates a number of a physical page of the data storage associated with the logical address, the sector offset indicates a number of a first sector of the physical page in which the compressed data is initially stored, and the sector number indicates a number of at least one sector of the physical page in which the compressed data is stored.

18. The data storage system of claim 17, wherein the storage device includes a bus, and further comprises a storage controller configured to generate the compressed data and transmit the compressed data to the nonvolatile storage in response to the first type of request, wherein the storage controller comprises:
a processor, coupled to the bus, configured to control an overall operation of the storage controller; a compression/decompression engine, coupled to the bus, configured to receive the original data, and configured to perform a compression operation on the original data to generate the compressed data; and
a nonvolatile interface, coupled to the processor and the compression/decompression engine via the bus, configured to provide the compressed data to the nonvolatile storage.

19. The data storage system of claim 15, wherein the mapping information maps a logical address of the data storage area to the sector offset and the sector number, and the update changes the sector number based on the received size.

* * * * *